US012658175B2

(12) United States Patent
Byun et al.

(10) Patent No.: US 12,658,175 B2
(45) Date of Patent: Jun. 16, 2026

(54) CONTROLLABLE DIFFUSION-BASED SPEECH GENERATIVE MODEL

(71) Applicant: QUALCOMM Incorporated, San Diego, CA (US)

(72) Inventors: Kyungguen Byun, San Diego, CA (US); Sunkuk Moon, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 18/494,640

(22) Filed: Oct. 25, 2023

(65) Prior Publication Data

US 2025/0078810 A1 Mar. 6, 2025

Related U.S. Application Data

(60) Provisional application No. 63/580,660, filed on Sep. 5, 2023.

(51) Int. Cl.
*G10L 13/10* (2013.01)
*G10L 13/027* (2013.01)

(52) U.S. Cl.
CPC ............ *G10L 13/10* (2013.01); *G10L 13/027* (2013.01)

(58) Field of Classification Search
CPC .............................. G10L 13/10; G10L 13/027
See application file for complete search history.

(56) References Cited

U.S. PATENT DOCUMENTS 11,605,388 B1 * 3/2023 Gupta .................. A63F 13/424
2020/0342852 A1 * 10/2020 Kim ...................... G06N 3/044
2025/0349282 A1 * 11/2025 Li .......................... G10L 15/02

OTHER PUBLICATIONS

Byun K., et al., "Highly Controllable Diffusion-Based Any-to-Any Voice Conversion Model with Frame-Level Prosody Feature", arXiv:2309.03364v1 [cs.SD], Arxiv.Org, Cornell University Library, 201 Olin Library Cornell University Ithaca, NY 14853, Sep. 6, 2023, 5 Pages, XP091607350, abstract section '1. Introduction', p. 1, right-hand column sections '2. Background' and '3. Proposed Model', p. 2 section '3.3. Inference scheme with prosody modulation', p. 3, right-hand column section '5. Conclusion', p. 4, right-hand column last paragraph.
International Search Report and Written Opinion—PCT/US2024/044535—ISA/EPO—Oct. 25, 2024.

(Continued)

*Primary Examiner* — Huyen X Vo
(74) *Attorney, Agent, or Firm* — QUALCOMM Incorporated; Espartaco Diaz Hidalgo

(57) ABSTRACT

Systems and techniques described herein relate to a diffusion-based model for generating converted speech from a source speech based on target speech. For example, a device may extract first prosody data from input data and may generate a content embedding based on the input data. The device may extract second prosody data from target speech, generate a speaker embedding from the target speech, and generate a prosody embedding from the second prosody data. The device may generate, based on the first prosody data and the prosody embedding, converted prosody data. The device may then generate a converted spectrogram based on the converted prosody data, the speaker embedding, and the content embedding.

30 Claims, 10 Drawing Sheets

(56) References Cited

OTHER PUBLICATIONS

Lee Y., et al., "Robust and Fine-Grained Prosody Control of End-to-End Speech Synthesis", ICASSP 2019—2019 IEEE International Conference on Acoustics, Speech and Signal Processing (ICASSP), IEEE, May 12, 2019, pp. 5911-5915, XP033566054, abstract p. 5911, right-hand column, paragraph 2 sections '3. Baseline Model' and '4. Proposed Method', p. 5912 section '5.5. Inter-speaker prosody transfer', p. 5914, right-hand column.

Lyu Z., et al., "Enriching Style Transfer in Multi-Scale Control Based Personalized End-to-End Speech Synthesis", 2022 12th International Conference on Information Science and Technology (ICIST), IEEE, Kaifeng, China, Oct. 14-16, 2022, Oct. 14, 2022, pp. 114-119, XP034219535, abstract section 'A. Reference Encoder', p. 115, figure 1 section 'C. Prosody Module', p. 116-p. 117, left-hand column section 'V. Conclusion', p. 119.

* cited by examiner

CONTROLLABLE DIFFUSION-BASED SPEECH GENERATIVE MODEL

CROSS-REFERENCE TO RELATED APPLICATIONS

This application claims priority to U.S. Provisional Patent Application No. 63/580,660, filed Sep. 5, 2023, which is hereby incorporated by reference, in its entirety and for all purposes.

TECHNICAL FIELD

The present disclosure generally relates to processing speech signals. For example, aspects of the present disclosure relate to a diffusion-based model for generating converted speech from a source speech based on target speech (e.g., the converted speech has prosody characteristics of target speech but maintains the same content as the source speech).

BACKGROUND

Diffusion-based voice conversion is a technique which includes an encoder and decoder structure in which source speech is provided to an average voice encoder to generate a content embedding. The source speech and target speech are provided to a speaker encoder to generate a speaker embedding. The content embedding and the speaker embedding are provided to a diffusion decoder that synthesizes a spectrogram depending on condition vectors associated with the content embedding and the speaker embedding. The approach depends on general speaker characteristics and utilizes a single embedding vector for voice conversion.

SUMMARY

Systems and techniques are described herein for providing a controllable diffusion-based speech generative model, which introduces a conversion process that provides additional controllability to prosodic features of speech. According to some aspects, an apparatus to generate output speech from input data is provided. The apparatus includes one or more memories configured to store the input data and one or more processors coupled to the one or more memories and configured to: extract first prosody data from the input data; generate a content embedding based on the input data; extract second prosody data from target speech; generate a speaker embedding from the target speech; generate a prosody embedding from the second prosody data; and generate, based on the first prosody data and the prosody embedding, converted prosody data.

In some aspects, a method of generating output speech from input data is provided. The method includes: extracting first prosody data from the input data; generating a content embedding based on the input data; extracting second prosody data from target speech; generating a speaker embedding from the target speech; generating a prosody embedding from the second prosody data; generating, based on the first prosody data and the prosody embedding, converted prosody data; and generating a converted spectrogram based on the converted prosody data, the speaker embedding and the content embedding.

In some aspects, a non-transitory computer-readable medium is provided having stored thereon instructions which, when executed by one or more processors, cause the one or more processors to be configured to: extract first prosody data from input data; generate a content embedding based on the input data; extract second prosody data from target speech; generate a speaker embedding from the target speech; and generate a prosody embedding from the second prosody data; generate, based on the first prosody data and the prosody embedding, converted prosody data.

In some aspects, an apparatus is provided that includes: means for extracting first prosody data from input data; means for generating a content embedding based on the input data; means for extracting second prosody data from target speech; means for generating a speaker embedding from the target speech; means for generating a prosody embedding from the second prosody data; means for generating, based on the first prosody data and the prosody embedding, converted prosody data; and means for generating a converted spectrogram based on the converted prosody data, the speaker embedding and the content embedding.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device or wireless communication device (e.g., a mobile telephone or other mobile device), a wearable device (e.g., a network-connected watch or other wearable device), a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyroscopes or gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Figure 1:
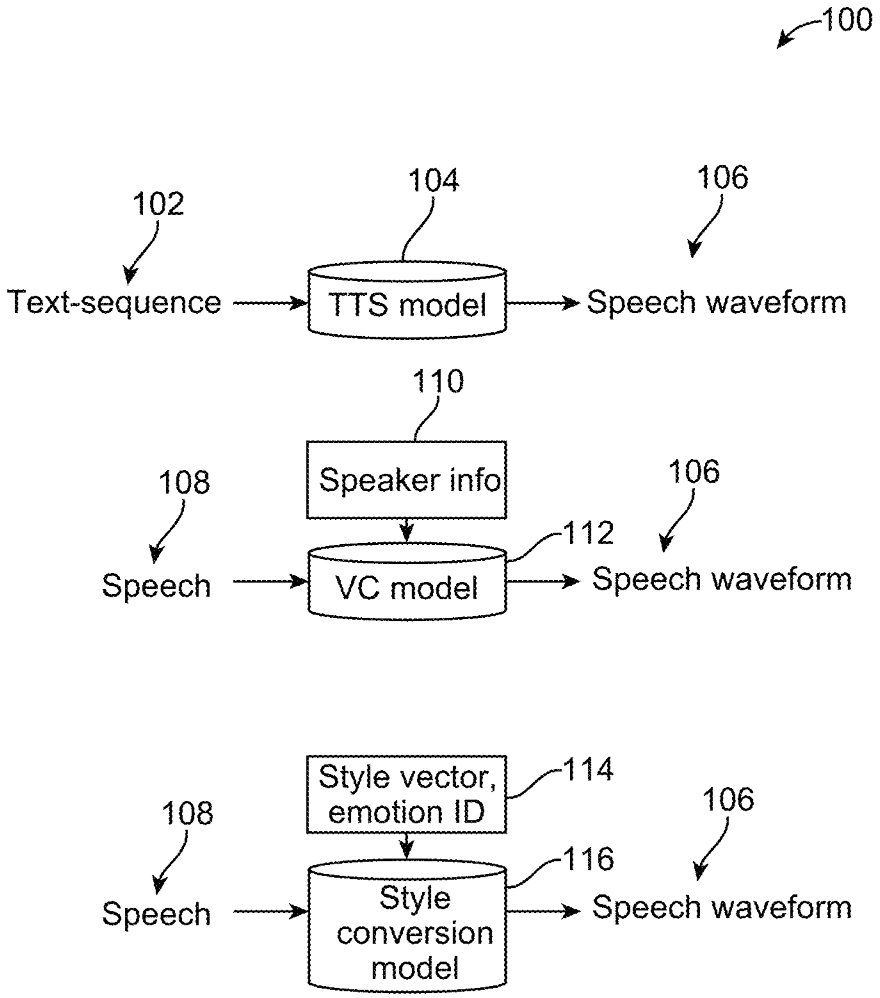
FIG. 1 is a conceptual diagram illustrating various speech generative models, in accordance with aspects of the present disclosure.

FIG. 1 is a conceptual diagram illustrating various speech generative models 100, in accordance with some aspects of this disclosure. A speech generative model can represent a model that generates speech from text, speech input, or other type of input. In general, speech generative models 100 generate desired speech by proper conditioning. For example, a test sequence 102 can be provided to a text-to-speech (TTS) model 104 which analyzes the text input and generates a speech waveform 106. A voice conversion (VC) model 112 can receive speech 108 (e.g., a speech waveform) and can receive speaker information 110 (e.g., data about characteristics of a human voice) and can convert the speech 108 into the speech waveform 106. In one example, the speaker information for example might include prosody data which includes characteristics of the speaker (e.g., the speaker information 110). The VC model 112 can adjust or modify characteristics of the speech 108 to match the speaker information 110 by adjusting prosody, speed, pitch, or any characteristic of the speech 108. Typically, the content of what is spoken (e.g., the words or sentences that are actually in the speech 108) will not change so that the same content (e.g., words or concepts in the content) is provided in the speech waveform 106 but with different characteristics.

The speech 108 can also be provided in an example system to a style/emotion conversion model 116 that receives a style vector/emotion identification 114. In some aspects, the speech waveform 106 that is generated changes the style of the speech 108 such as from happy to sad, or from a normal state to an angry state or a surprised state. The style vector/emotion identification 114 can change the style or the emotion from a first state to a second state. This disclosure provides various approaches to converting speech from a first state to a second state. Part of this disclosure includes the ability to use a conversion engine or module that is highly controllable. For example, the conversion engine or module can provide frame-level intonation control and can utilize prosody related features such as a fundamental frequency $f_0$, an energy and a speech associated with speech. In one aspect, the conversion engine or module can provide speaking rate control without a traditional automatic speech recognition model.

Figure 2:
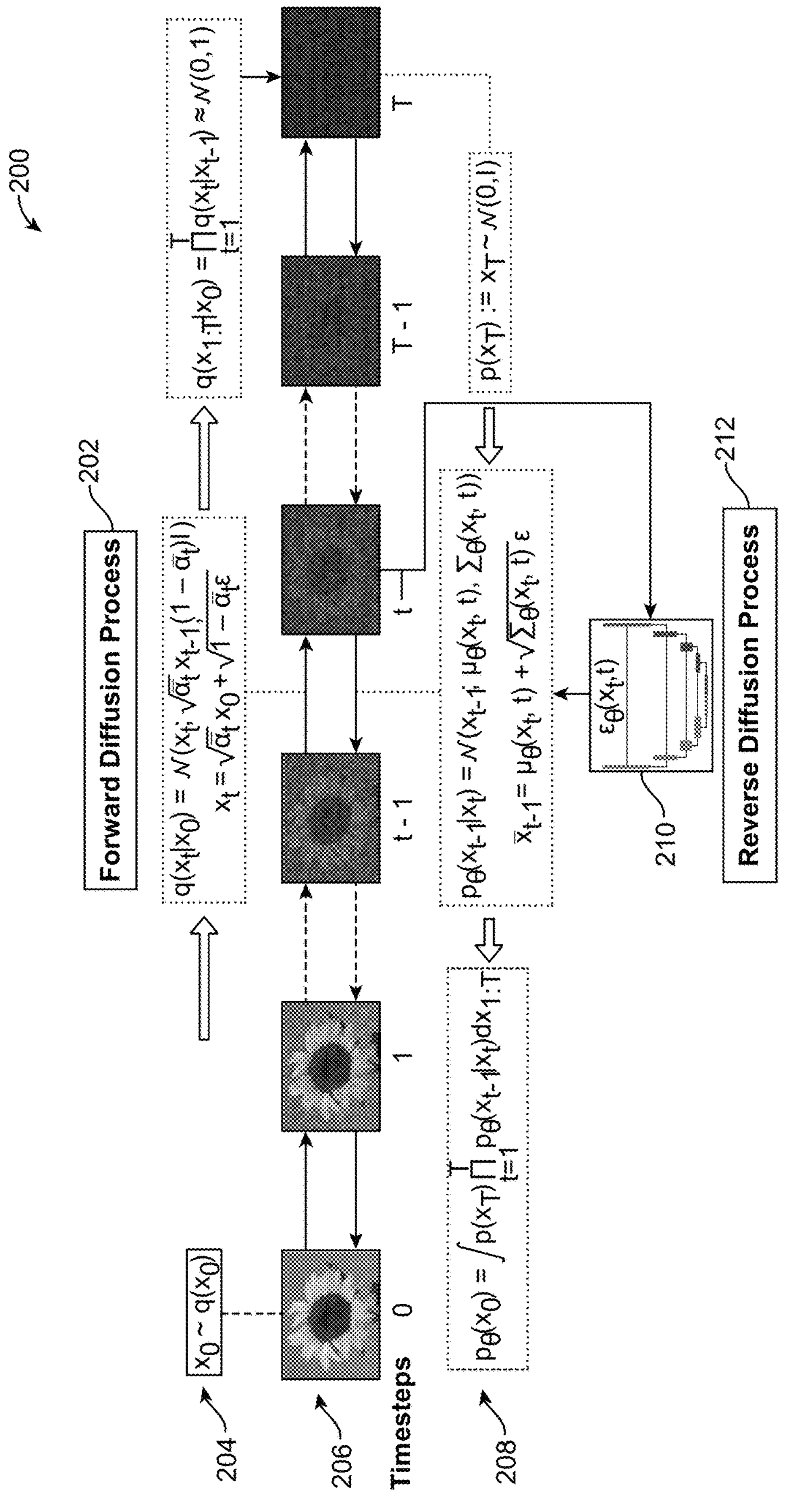
FIG. 2 is a conceptual diagram illustrating an example of a diffusion model, in accordance with aspects of the present disclosure.

FIG. 2 is a conceptual diagram illustrating an example of a diffusion model 200, in accordance with some aspects of this disclosure. Diffusion models are often used in the computer vision context in which high-quality images can be generated from a text prompt. Instead of a one-step generation process, a diffusion model learns a gradual generation process. In a forward diffusion process 202, various mathematical operations 204 are shown in FIG. 2 for each step or each time stamp associated with an image 206 from time 0 to time T. In the forward diffusion process 202, the model 200 artificially generates noise to generate more noisy samples as is shown in the progression from timestamp 0 to timestamp T. The diffusion model 200 artificially adds noise into original image 206 at each step. In a reverse diffusion process 212, the mathematical operations 208 utilize a UNet 210 (e.g., a convolutional neural network having a "U" shaped architecture) such that the model estimates the noise component at each step from a timestamp T (a noisy image) to refined and reduce the noise at each step to generate the original image 206 shown at timestamp 0. A Unet is a deep-learning architecture for semantic segmentation. In one example, the UNet 210 can include a contracting path and an expansive path as shown in FIG. 2. The contracting path follows the typical architecture of a convolutional network. The contracting path can include the repeated application of two 3×3 convolutions (unpadded convolutions), each followed by a rectified linear unit (ReLU) and a 2×2 max pooling operation with stride 2 for downsampling and/or compressing the information. The "stride 2" indicates that a kernel or filter (e.g., a max pooling kernel/filter) is moved two positions after each operation of the kernel or filter. At each downsampling step, the structure is to double the number of feature channels. Every step in the expansive path includes an upsampling of the feature map followed by a 2×2 convolution ("up-convolution") that halves the number of feature channels, a concatenation with the correspondingly cropped feature map from the contracting path, and two 3×3 convolutions, each followed by a ReLU. The cropping may be performed due to the loss of border pixels in every convolution. At the final layer, a 1×1 convolution is used to map each 64-component feature vector to the desired number of classes. In total, one example Unet network has 23 convolutional layers. With the diffusion model process, a realistic and easily controllable generative model can be obtained.

Recently, the diffusion model 200 has been used in generative modelling for images. There are also some text-to-image generation services such as Dall-E or Midjourney. For example, these services generate images from a text description and are like an image version of ChatGPT. The core process of diffusion model 200 is multi-step generation process that include the forward diffusion process 202 and the reverse diffusion process 212 as shown in FIG. 2.

Figure 3A:
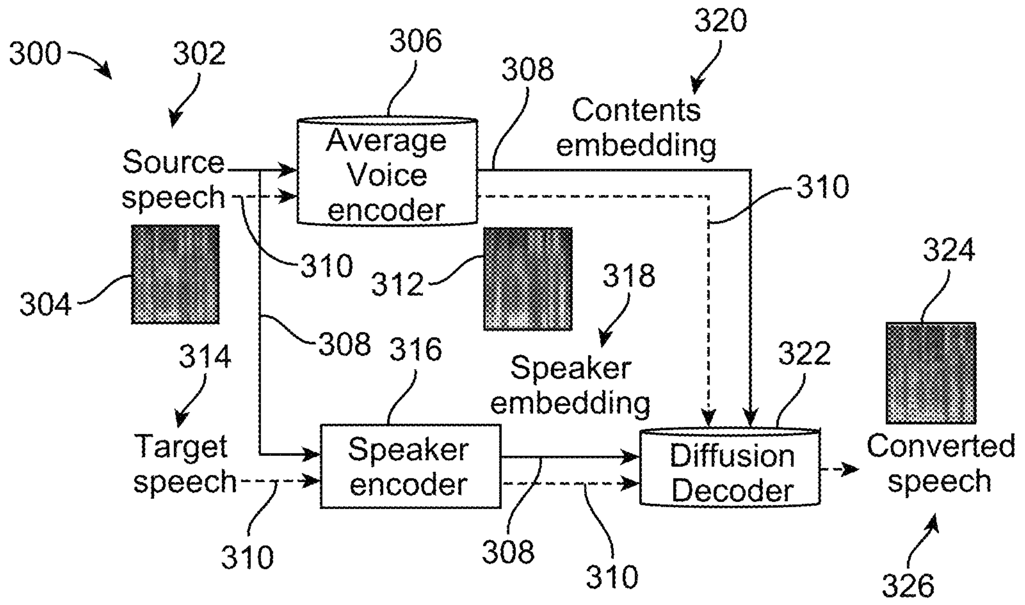
FIG. 3A illustrates a baseline voice conversion system, in accordance with aspects of the present disclosure.

The diffusion model 200 can also successfully be applied in a speech generative model. FIG. 3A illustrates a baseline voice conversion system 300. In some cases, the baseline voice conversion system 300 can be a diffusion voice conversion (DiffVC) system. The baseline voice conversion system 300 includes an average voice encoder 306 and a diffusion decoder 322. The average voice encoder 306 (also referred to as a content encoder) obtains an average spectrum 304 from source speech 302 as the input, which differs from a text or a content related feature. A speaker encoder 316 receives target speech 314 and the source speech 302 and generates a speaker embedding 318. The embeddings disclosed herein represent generally a transformation of data from one context to another for further processing. An embedding in general is a dense numerical representation of a real-world object (e.g., such as audio) and relationships and can be expressed as a vector. The diffusion decoder 322 generates an output spectrogram 324 from the average spectrogram 312 or contents embedding 320 and speaker information or speaker embedding 318. In natural language processing, a word embedding is a representation of a word. The embedding can be used in text analysis. Typically, the representation is a real-valued vector that encodes the meaning of the word in such a way that words that are closer in the vector space are expected to be similar in meaning.

Some of the flow lines in FIG. 3A relate to a training process. For example, flow lines 308 show the flow of data for a training phase and flow lines 310 relate to the flow during an inference or prediction phase when the baseline voice conversion system 300 generates converted speech.

Figure 3B:
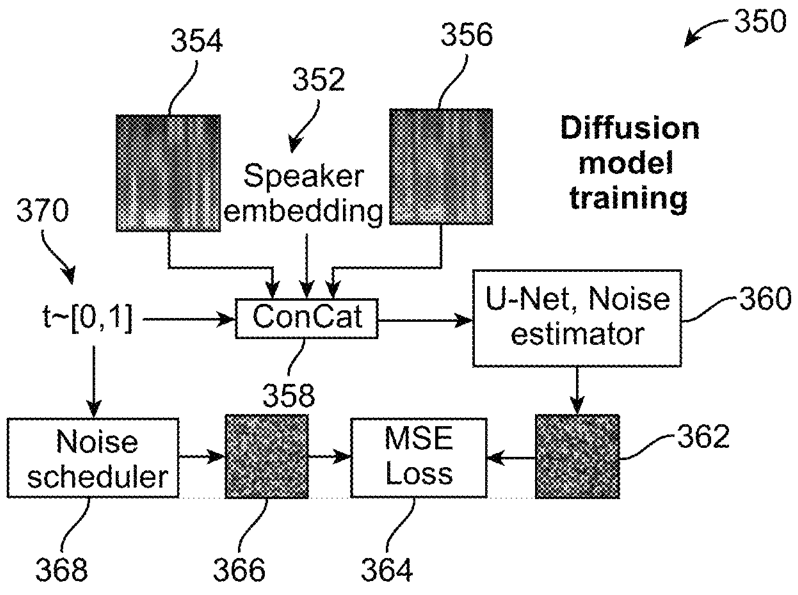
FIG. 3B is a block diagram of diffusion decoder training process, in accordance with aspects of the present disclosure.

FIG. 3B illustrates a diffusion decoder training process 350. During the training, source speech is provided to the average voice encoder 306. The model tries to reconstruct itself from the content-only feature or contents embedding 320 and the speaker embedding 318 which is the same process in the conversion process shown in FIG. 3A. As a result, the processing of learning reconstruction is similar to a learning conversion process, which can make the model able to cope with unseen speaker information. In some aspects, training in any context can occur on a device in real time.

The diffusion decoder can be, for example, the diffusion decoder 322 of FIG. 3A. A speaker embedding 352, a first spectrogram 354 and a second spectrogram 356 can be provided to a concatenation module 358. A value 370 can also be provided to the concatenation module 358 for concatenation with the other data to provide output data to a U-Net 360 which can be a noise estimator. A noisy image 362 can be generated. A noise scheduler 368 generates noise 366 from the value and a mean squared error loss 364 value is determined between the noise 366 and the noisy image 362. The mean squared error loss 364 is used to train the diffusion decoder 322.

There are limitations on the approach shown in FIGS. 3A and 3B. One limitation is that, in addition to the contents embedding 320, a single speaker embedding 318 is the only factor that controls the output or converted speech 326. The (single) speaker embedding 318 spans the entire time and frequency domain for conditioning. The speaker encoder 316 can capture global speaker or speaking characteristics. However, another limitation is that it is difficult in the structure shown in FIG. 3A to further control the conversion process of the speech in categories such as intonations, stressing, and speaking rate.

Figure 4A:
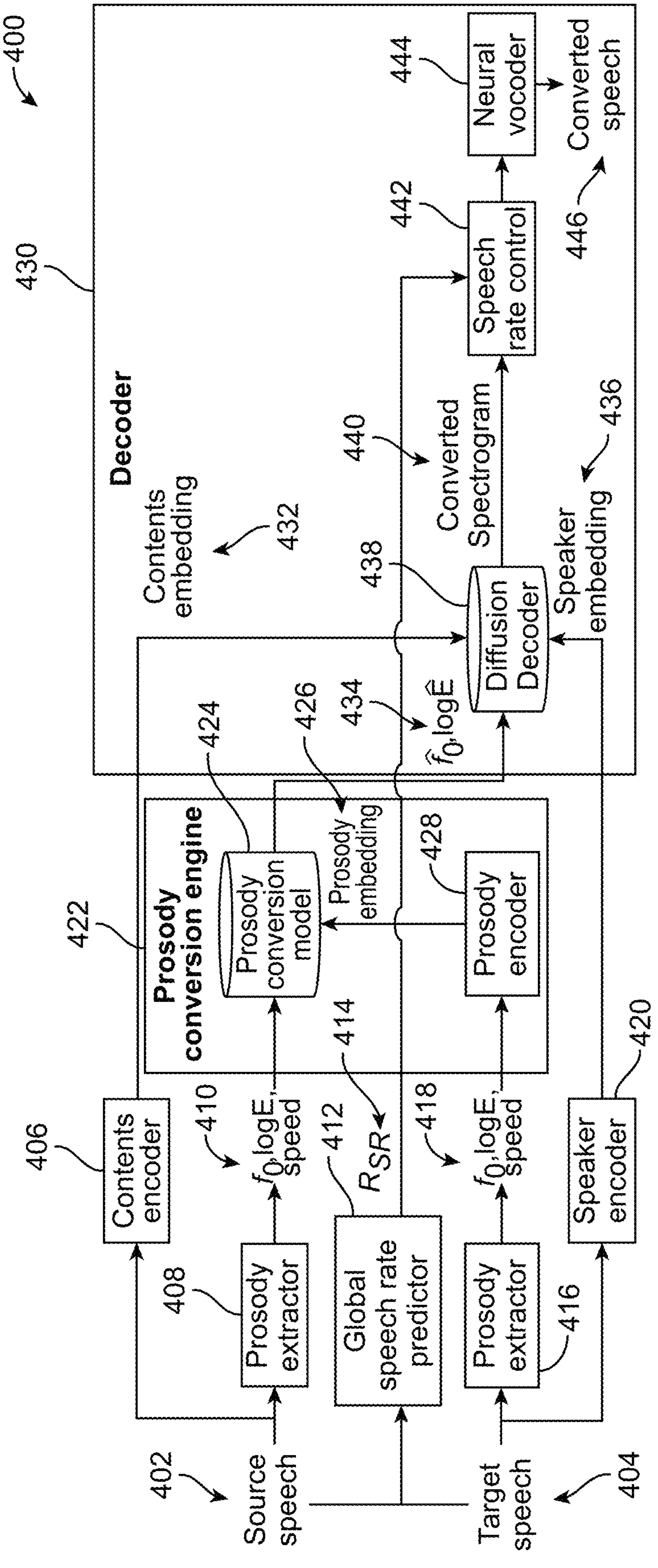
FIG. 4A is a conceptual diagram illustrating an overall system for generating converted speech, in accordance with aspects of the present disclosure.

FIG. 4A illustrates a proposed approach to providing a highly controllable diffusion-based speech generative model. A system for generating converted speech 400 is disclosed with a prosody conversion engine 422 and a decoder 430. Source speech 402 is provided a first prosody extractor 408 and a contents encoder 406. The source speech 402 is also provided to a global speech rate predictor 412. Target speech 404 is provided to the global speech rate predictor 412, a second prosody extractor 416 and a speaker encoder 420. The contents encoder 406 generates a content embedding 432. The first prosody extractor 408 generates first output data 410 which can be raw prosody features such as one or more of a fundamental frequency $f_0$, an energy value (e.g., a log energy value log e) and a speed. The global speech rate predictor 412 receives the source speech 402 and the target speech 404 and generates a reference speaking rate or $R_{SR}$ 414. The second prosody extractor 416 generates second output data 418 which can be raw prosody features such as one or more of a fundamental frequency $f_0$, an energy value (e.g., a log energy value log e) and a speed. The speaker encoder 420 generates from the target speech 404 a speaker embedding 436. The prosody conversion engine 422 includes a prosody encoder 428 that generates from the second output data 418 a prosody embedding 426. The prosody encoder 428 captures global prosody features and can receive raw prosody features and low-frequency band spectrum information (the second output data 418) as inputs.

Figure 4B:
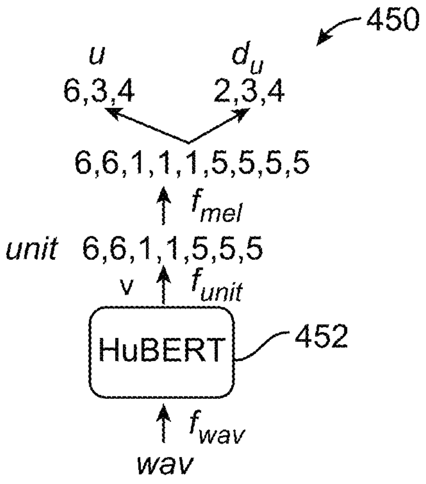
FIG. 4B illustrates a conceptual diagram illustrating a HuBERT model for generating a conversion ratio, in accordance with aspects of the present disclosure.

The reference speaking rate or the $R_{SR}$ 414 value can be generated using a HuBERT-based unit and duration prediction component. For example, for the speaking rate control, as shown in FIG. 4B, the system can use a HuBERT model is a self-supervised model to get a unit value and a duration value for source and target speech. Details about the HuBERT model can be found at Hsu et al. HuBERT: Self-Supervised Speech Representation Learning by Masked Prediction of Hidden Units, arXiv: 2106.07447v1, Jun. 14, 2021, incorporated herein by reference. A "unit" means speech token index which is similarly working as a phoneme and duration is its duration in terms of number of speech frames. Once the unit, duration pair is obtained, then it is possible to compute a speaking rate by averaging the duration. An example of the process is shown in FIG. 4B.

The prosody conversion engine 422 also includes a prosody conversion model 424 that receives the first output data 410 (e.g., speech) and the prosody embedding 426 and generates third output data 434 which can be, for example, a revised fundamental frequency $f_0$ and a revised energy value log E'. The prosody embedding 426 can also be characterized as a global prosody embedding. The second output data 418 can include raw prosody features and a low-frequency mel-spectrogram. A mel-spectrogram makes two important changes relative to regular spectrograms that plot frequency versus time. The mel-spectrogram uses the Mel Scale (or Melody Scale) instead of frequency on the y-axis and the mel-spectrogram uses the decibel scale instead of amplitude to indicate colors when colors are used. The use of the mel-spectrogram is to adjust the data to be more in harmony with how humans perceive sound because most of what humans can hear is concentrated in a narrow range of frequencies.

Next, the decoder 430 can include a diffusion decoder 438 that receives the content embedding 432 from the contents encoder 406 and receives the third output data 434 from the prosody conversion model 424 and the speaker embedding 436 from the speaker encoder 420. The diffusion decoder 438 generates a converted spectrogram 440 which can be provided to a speech rate control component 442. The speech rate control component 442 can also receive the $R_{SR}$ 414 (e.g., the conversion ratio between the source speech 402 and the target speech 404) which can generate a rate-controlled spectrogram which can be provided to a vocoder 444 (e.g., a neural vocoder) which can generate the converted speech 446. The converted speech 446 represents a synthesized waveform from the speech spectrum of the converted spectrogram 440 at the speaking control value generated by the speech rate control component 442. The speech rate control component 442 manipulates the speaking rate of the converted spectrogram 440 based on the conversion ratio or the $R_{SR}$ 414. The prosody conversion model 424 converts raw prosody features from the source speech 402 into prosody features of the target speech 404 using the prosody embedding 426 from the prosody encoder 428. The diffusion decoder 438 also can explicitly be a non-diffusion decoder. The decoder is not limited herein to a diffusion decoder 438 but can also encompass other types of decoders.

The main difference between proposed approach shown in FIG. 4A and the baseline model is that the system for generating converted speech 400 or speech generative model uses a frame-level prosody feature as an additional control factor for the diffusion model in the diffusion decoder 438. The model includes two parts with the first part being the prosody conversion engine 422 and the second part being the decoder 430. In the prosody conversion engine 422, the prosody conversion engine 422 extracts raw prosody features of source speech 402 and converts those features to match the features of the target speech 404.

FIG. 4B illustrates a diagram 450 with the operation of a HuBERT-based unit and direction prediction model 452. An input wave value "wav" can have a frequency $f_{wav}$. The HuBERT-based unit and direction prediction model 452 generates a prediction associated with a speaking rate control using the source speaker and target speaker data. The goal is to obtain a speaking rate conversion ratio or the $R_{SR}$ 414. The output of the HuBERT-based unit and direction prediction model 452 is a frequency value $f_{unit}$ such as, for example, 6, 6, 1, 1, 5, 5, 5. The value can be converted to frequency values in the mel-spectrum $f_{mel}$ such as 6, 6, 1, 1, 1, 5, 5, 5, 5. The data in turn can be divided into a unit value u 6, 1, 5 and a direction $d_u$ 2,3,4. The $R_{SR}$ 414 can equal $E[d_{u\_source}]/E[d_{u\_target}]$. The diffusion decoder 438 output can be re-sampled with the $R_{SR}$ 414. Thus, from the prediction of the speaking rate for the source speaker and the target speaker, the global speech rate predictor 412 can provide the $R_{SR}$ 414 used by the speech rate control component 442.

Figure 5A:
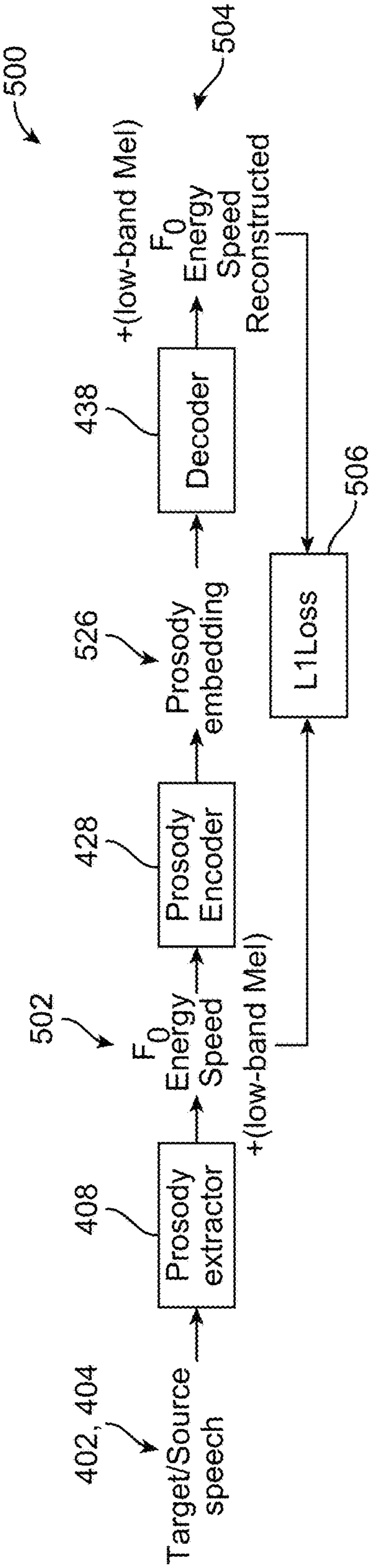
FIG. 5A illustrates an example of a training and inference scheme for a highly controllable diffusion-based speech generative model, in accordance with aspects of the present disclosure.
Figure 5B:
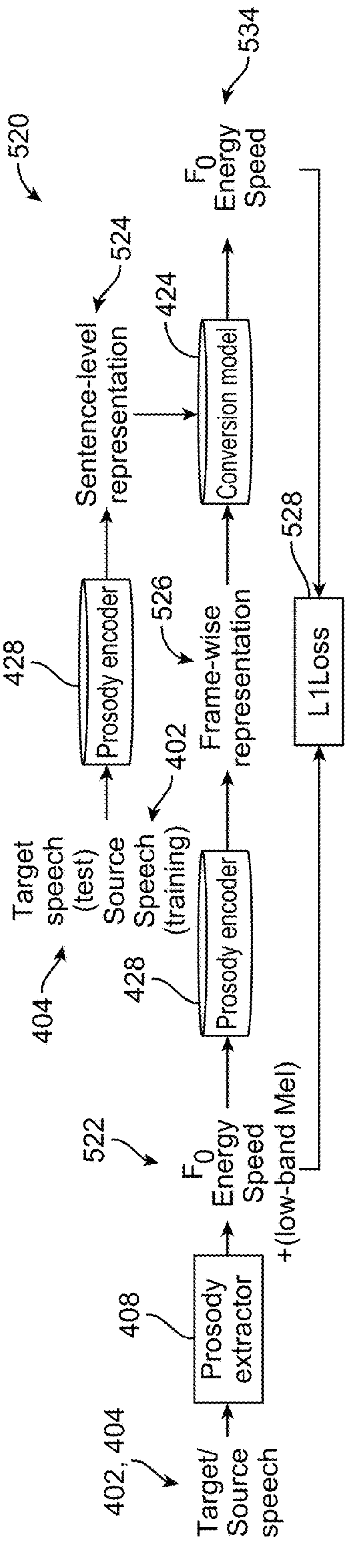
FIG. 5B illustrates an example of a training and inference scheme for a highly controllable diffusion-based speech generative model, in accordance with aspects of the present disclosure.

FIG. 5A illustrates a block diagram of a training and inference scheme 500 for the prosody encoder 428 of FIG. 4A. FIGS. 5A and 5B illustrate training and inference scheme for the proposed model. In one aspect, the approach uses pre-trained modules for a speaker encoder and a content encoder. The prosody encoder can be trained in a self-supervised manner similar to the process associated with autoencoder. The process seeks to extract intermediate embeddings while reconstructing itself. The prosody features and low-band mel-spectrogram are used to make the model focus on the prosody aspect of the data. The prosody conversion model is similarly trained like other voice conversion systems except for the input and output of the model is not mel-spectrogram but prosody features.

An example process provides prosody conversion training for the prosody encoder 428. FIG. 5A shows the source or target speech 402, 404 provided to the first prosody extractor 408 which generates output data 502 such as one or more of a fundamental frequency $f_0$, an energy and a speed. The data can also include a low-band mel-spectrogram. The data is provided to a prosody encoder 428 as well as a loss engine 506. The prosody encoder 428 generates the prosody embedding 526 which is provided to the decoder 438. The prosody embedding 526 can include frame-level data and sentence-level data. The decoder 438 generates output data 504 including one or more of a fundamental frequency $f_0$, energy and speed. The output data 504 may also include other information, such as a low-band mel-spectrogram. The output data 504 can be provided to a loss engine 506. The loss engine 506 can generate or determine a loss (e.g., a loss value) between the output data 502 and the output data 504. The loss can be then used to train the prosody conversion engine 422 (e.g., by performing backpropagation to tune parameters, such as weights, of the prosody conversion engine 422).

FIG. 5B illustrates another block diagram of a training and inference scheme 520 for the prosody encoder 428 of FIG. 4A. FIG. 5B shows the source or target speech 402, 404 provided to the prosody extractor 408 that generates output data 522 such as a fundamental frequency $f_0$, an energy and speed. The output data 522 can also include a low-band mel-spectrogram. The output data 522 is provided to a prosody encoder 428 as well as a loss engine 528. The prosody encoder 428 generates the prosody embedding 526 which is provided to the prosody conversion model 424. The prosody embedding 526 can be a frame-wise representation of the target or source speech 402, 404. In some cases, the target speech 404 can be test data and the source speech 402 can be training data. In some aspects, the data can be provided to a prosody encoder 428, which can generate a sentence-level (and/or frame-level) representation 524. The sentence-level (and/or frame-level) representation 524 can also provided to the prosody conversion model 424. The prosody conversion model 424 receives the prosody embedding 526 (e.g., the frame-wise representation) and in some cases the sentence-level (and/or frame-level) representation 524. Based on the prosody embedding 526 (e.g., the frame-wise representation) and in some cases the sentence-level (and/or frame-level) representation 524, the prosody conversion model 424 can generate third output data 534 which can include one or more of a fundamental frequency $f_0$, an energy and speed, as well as converted speech. The output data 534 can be provided to the loss engine 528. The loss engine 528 can generate or determine a loss (e.g., a loss value) between the output data 502 and the output data 504. The loss generated by the loss engine 528 can be used to train the prosody conversion engine 422 (e.g., by performing backpropagation to tune parameters, such as weights, of the prosody conversion engine 422).

Figure 6:
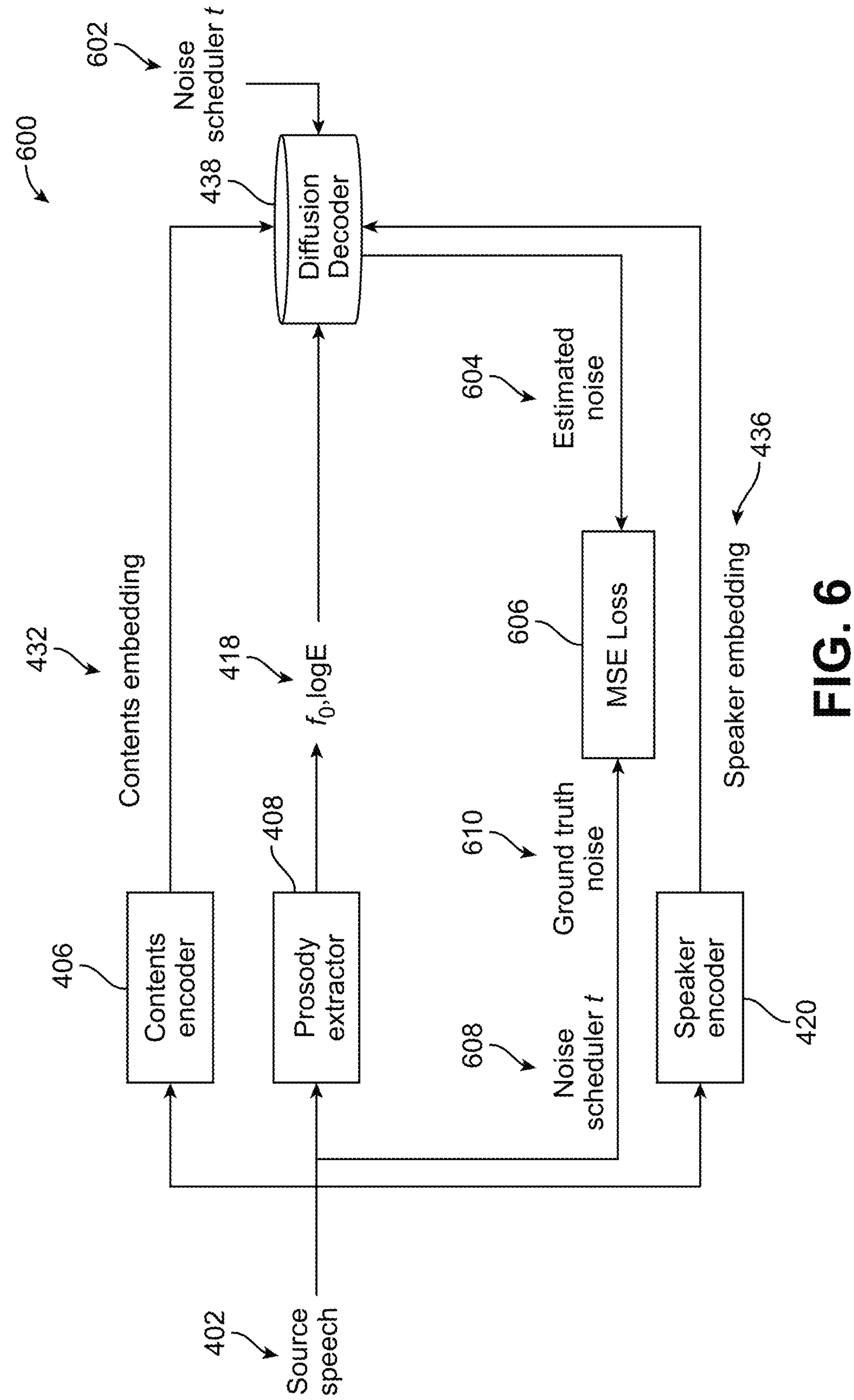
FIG. 6 illustrates an example of a training and inference scheme for a highly controllable diffusion-based speech generative model, in accordance with aspects of the present disclosure.

FIG. 6 illustrates a highly controllable diffusion-based speech generative model training and inference scheme 600. For decoder training, in one aspect, the approach can include freezing the weights of encoders while training the decoder. A different utterance of a same speaker can be used as the reference speech. Thus, the source speech 402 is provided to a contents encoder 406 that produces a content embedding 432. The source speech 402 is provided to a first prosody extractor 408 that generates the second output data 418 (e.g., a fundamental frequency $f_0$ and an energy value). The source speech 402 is provided to a speaker encoder 420 that generates a speaker embedding 436. The content embedding 432, the second output data 418 and the speaker embedding 436 are provided to a diffusion decoder 438 along with the noise scheduler t 602. The diffusion decoder 438 produces an estimated noise 604 which is provided to a mean square error (MSE) loss engine 606. The source speech 402 is also provided as a noise scheduler t 608 which can be a ground truth noise 610 to the MSE loss engine 606. The output of the MSE loss engine 606 can be used to train the diffusion decoder 438. The source speech 402 is converted to the content embedding 432 via the contents encoder 406. The source speech 402 is converted to a speaker embedding 436 via the speaker encoder 420. The source speech 402 is converted to prosody or the second output data 418 (e.g., $f_0$. Log E) via the first prosody extractor 408 which ultimately leads to the reconstructed speech. A loss can be calculated by the MSE loss engine 606 between (N(source, t), N(reconstructed, t)).

At inference time, as is shown in FIG. 4A, the target speech 404 from a target speaker is given as the reference speech. The source speech 402 is used to generate the content embedding 432. The target speech 404 is used to generate the speaker embedding 436 and the prosody embedding 426. The converted spectrogram 440 from the diffusion decoder 438 can be a synthesized spectrogram using the content embedding 432, the speaker embedding 436 and the prosody embedding 426. Also shown in FIG. 4A, the speech rate control component 442 and the vocoder 444 (e.g., a neural vocoder) are used to obtain speech output or the converted speech 446.

Figure 7:
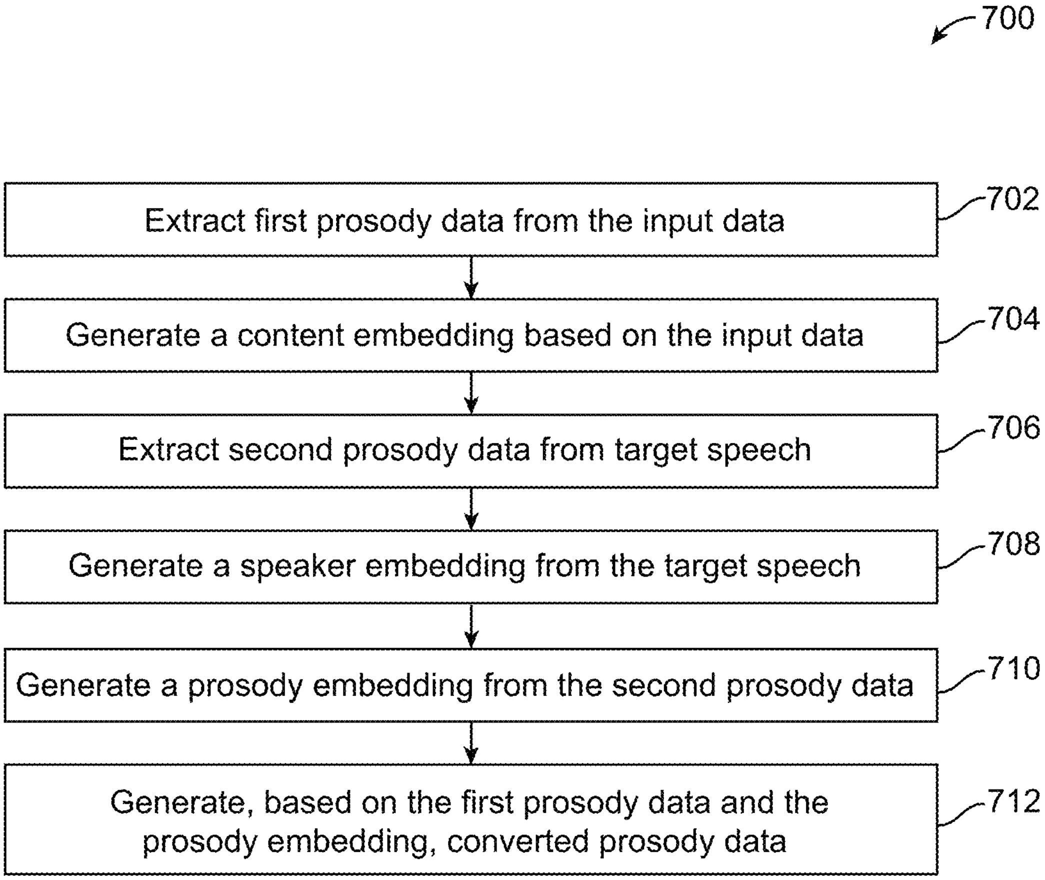
FIG. 7 illustrates an example process utilizing a controllable diffusion-based speech generative model, in accordance with aspects of the present disclosure.

FIG. 7 is a flowchart illustrating an example process 700 for generating converted speech from input data, such as the target speech 402, 404. The process 700 can include any one or more of the steps disclosed herein. The process 700 can be performed using a system, apparatus, or computing device (or component thereof, such as a chipset, one or more processors, etc.), referred to generally as a system. In some aspects, the system can include the system of FIG. 4A having a contents encoder 406, one or more prosody extractor 408, 416, a global speech rate predictor 412, a prosody conversion engine 422 having a prosody encoder 428 and a prosody conversion model 424, a speaker encoder 420, a decoder 430 having a diffusion decoder 438 (or some other type of decoder), a speech rate control component 442 and a vocoder 444, the computing system 800, or a combination thereof.

At operation 702, the system (or component thereof) can extract first prosody data from input data. In some aspects, the input data can include one or more of speech data, text data or other types of data. The first prosody data can include one or more of a fundamental frequency, an energy value and a speed value.

At operation 704, the system (or component thereof) can generate a content embedding based on the input data.

At operation 706, the system (or component thereof) can extract second prosody data from target speech. In some aspects, the second prosody data can include one or more of a fundamental frequency, an energy value and a speed value.

At operation 708, the system (or component thereof) can generate a speaker embedding from the target speech.

At operation 710, the system (or component thereof) can generate a prosody embedding from the second prosody data.

At operation 712, the system (or component thereof) can generate, based on the first prosody data and the prosody embedding, converted prosody data. In some aspects, the input data includes speech data. In such aspects, the system can include one or more microphones configured to capture the speech data. In some cases, the system can include one or more speakers configured to output speech data comprising the converted prosody data.

In some aspects, the system (or component thereof) can generate a converted spectrogram based on the converted prosody data, the speaker embedding and the content embedding.

In some aspects, the system (or component thereof) can generate the converted spectrogram based on the converted prosody data, the speaker embedding and the content embedding via a decoder (e.g., the diffusion decoder 438 of FIG. 4A). The decoder can include a diffusion decoder, a non-diffusion decoder or a diffusion decoder of a different type.

In some aspects, the system (or component thereof) can generate, based on the converted prosody data, a predicted global speaking rate and via a rate control engine (e.g., speech rate control component 442), a speaking rate for the converted spectrogram; and generating, via a vocoder (e.g., vocoder 444 of FIG. 4A), converted speech based on the input data. In some aspects, the rate control engine can manipulate a speaking rate depending upon a predicted speed. In some cases, the vocoder (e.g., vocoder 444 of FIG. 4A) can include a neural vocoder or some other type of vocoder. The vocoder analyzes and synthesizes a human voice signal. In some aspects, the vocoder examines speech by measuring how its spectral characteristics change over time. The vocoder generates a series of signals representing these frequencies at any particular time as the user speaks or based on the input data. The signal can be split into a number of frequency bands and the level of signal present at each frequency band gives the instantaneous representation of the spectral energy content. To recreate speech, the vocoder reverses the processes of a broadband noise source by passing the data through a stage that filters the frequency content based on the originally recorded series of numbers.

In some aspects, the system (or component thereof) can extract the first prosody data from the input data via a first prosody extractor engine. The system (or component thereof) can generate the content embedding based on the input data via a content encoder. The system (or component thereof) can further extract the second prosody data from target speech via a second prosody extractor engine. The system (or component thereof) can generate the speaker embedding from the target speech via a speaker encoder.

In some aspects, the system (or component thereof) can generate the prosody embedding from the second prosody data via a prosody encoder (e.g., the prosody encoder 428). The system (or component thereof) can generate, based on the first prosody data and the prosody embedding, converted prosody data via a prosody conversion engine (e.g., prosody conversion engine 422). The system (or component thereof) can generate the converted spectrogram based on the converted prosody data, the speaker embedding and the content embedding via a decoder (e.g., the diffusion decoder 438). In some cases, the prosody encoder can generate the prosody embedding at one or more of a frame-level and/or a sentence-level or at different levels of granularity, which enables an increased amount of controllability of the prosody characteristics.

In some aspects, the system (or component thereof) can be or can include a decoder (e.g., the diffusion decoder 438). In such aspects, the decoder can be configured to synthesize a speech spectrum conditioned on the content embedding, the speaker embedding, and the converted prosody data.

In some aspects, the system (or component thereof) can be or can include a prosody encoder (e.g., the prosody encoder 428). In such aspects, the prosody encoder can be configured to generate the prosody embedding at the frame-level to enable frame-level intonation control.

In some aspects, the system (or component thereof) can generate, based on the converted prosody data via the rate control engine, the speaking rate for the converted spectrogram independent of an automatic speech recognition model.

In some aspects, a non-transitory computer-readable medium (e.g., memory 815, ROM 820, RAM 825, or cache 811 of FIG. 8) having stored thereon instructions which, when executed by one or more processors (e.g., processor 812), cause the one or more processors to be configured to: extract first prosody data from input data; generate a content embedding based on the input data; extract second prosody data from target speech; generate a speaker embedding from the target speech; and generate a prosody embedding from the second prosody data; generate, based on the first prosody data and the prosody embedding, converted prosody data; and generate a converted spectrogram based on the converted prosody data, the speaker embedding and the content embedding.

In some aspects, an apparatus can include means for extracting first prosody data from input data; means for generating a content embedding based on the input data; means for extracting second prosody data from target speech; means for generating a speaker embedding from the target speech; means for generating a prosody embedding from the second prosody data; means for generating, based on the first prosody data and the prosody embedding, converted prosody data; and means for generating a converted spectrogram based on the converted prosody data, the speaker embedding and the content embedding. The means for performing any of the above functions can include the system for generating converted speech 400 in FIG. 4A having a contents encoder 406, one or more prosody extractor 408, 416, a global speech rate predictor 412, a prosody conversion engine 422 having a prosody encoder 428 and a prosody conversion model 424, a speaker encoder 420, a decoder 430 having a diffusion decoder 438, a speech rate control component 442 and a vocoder 444, the computing system 800, or a combination thereof.

The system, apparatus, or computing device configured to perform the process 700 can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 700 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
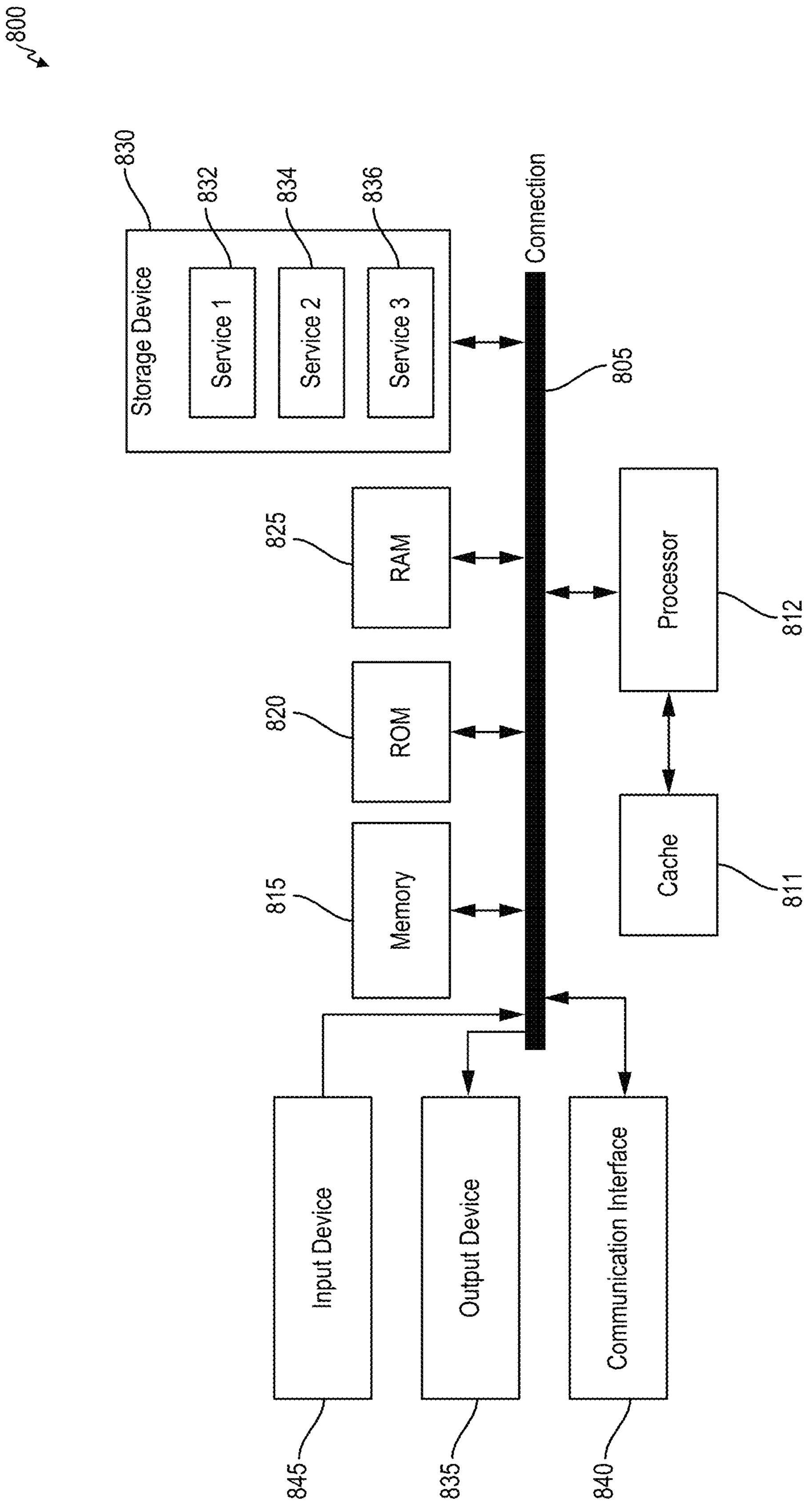
FIG. 8 is a diagram illustrating an example system architecture for implementing certain aspects described herein, in accordance with aspects of the present disclosure.

FIG. 8 is a diagram illustrating an example of a system for implementing certain aspects of the present disclosure. In particular, FIG. 8 illustrates an example of computing system 800, which can be for example any computing device making up a computing system, a camera system, or any component thereof in which the components of the system are in communication with each other using connection 805. Connection 805 can be a physical connection using a bus, or a direct connection into processor 812, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 800 includes at least one processing unit (CPU or processor) 812 and connection 805 that couples various system components including system memory 815, such as read-only memory (ROM) 820 and random access memory (RAM) 825 to processor 812. Computing system 800 can include a cache 811 of high-speed memory connected directly with, in close proximity to, or integrated as part of processor 812.

Processor 812 can include any general purpose processor and a hardware service or software service, such as services 832, 834, and 836 stored in storage device 830, configured to control processor 812 as well as a special-purpose processor where software instructions are incorporated into the actual processor design. Processor 812 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 812, the code causes the system to perform a function. In some examples, a hardware service that performs a particular function can include the software component stored in a computer-readable medium in connection with the necessary hardware components, such as processor 812, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Figure 9:
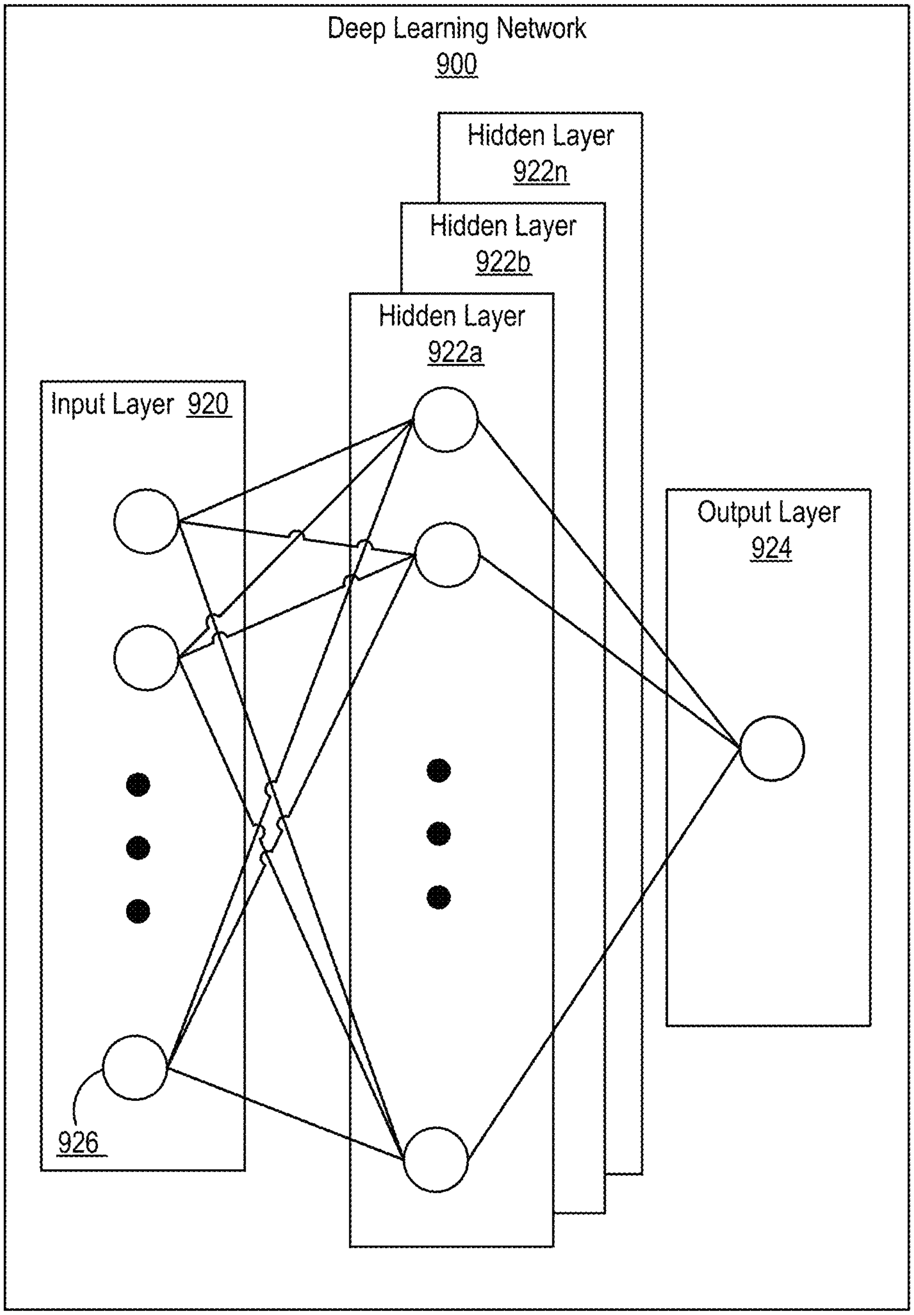
FIG. 9 illustrates an example neural network, in accordance with aspects of the present disclosure.

As described herein, the neural network 900 of FIG. 9 may be implemented using a neural network or multiple neural networks. FIG. 9 is an illustrative example of a deep learning neural network 900 that can be used by the neural network 900 of FIG. 9. An input layer 920 includes input data. In one illustrative example, the input layer 920 can include data representing the pixels of an input video frame. The neural network 900 includes multiple hidden layers 922*a*, 922*b*, through the last hidden layer 922*n*. The hidden layers 922*a*, 922*b*, through 922*n* include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922*a*, 922*b*, through the last hidden layer 922*n*. In one illustrative example, the output layer 924 can provide a classification for an object in an input video frame. The classification can include a class identifying the type of object (e.g., a person, a dog, a cat, or other object).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922*a*. For example, as shown, each of the input nodes of the input layer 920 is connected to each of the nodes of the first hidden layer 922*a*. The nodes of the hidden layers 922*a*, 922*b*, through the last hidden layer 922*n* can transform the information of each input node by applying activation functions to the information. The information derived from the transformation can then be passed to and can activate the nodes of the next hidden layer 922*b*, which can perform their own designated functions. Example functions include convolutional, up-sampling, data transformation, and/or any other suitable functions. The output of the hidden layer 922*b* can then activate nodes of the next hidden layer, and so on. The output of the last hidden layer 922*n* can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, the neural network can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922*a*, 922*b*, through a last hidden layer 922*n* in order to provide the output through the output layer 924. In an example in which the neural network 900 is used to identify objects in images, the neural network 900 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 900 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(\text{target}-\text{output})^2$, which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and n denotes a learning rate. The learning rate can be set to any suitable value, with a high learning rate including larger weight updates and a lower value indicating smaller weight updates.

In some cases, the neural network 900 can be trained using self-supervised learning.

The neural network 900 can include any suitable deep network. One example includes a convolutional neural network (CNN), which includes an input layer and an output layer, with multiple hidden layers between the input and out layers. The hidden layers of a CNN include a series of convolutional, nonlinear, and/or pooling (for downsampling) layers, can include one or more fully connected layers. The neural network 900 can include any other deep network other than a CNN, such as an autoencoder, a deep belief nets (DBNs), a Recurrent Neural Networks (RNNs), among others.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C. A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus to generate output speech from input data, comprising: one or more memories configured to store the input data; and one or more processors coupled to the one or more memories and configured to: extract first prosody data from the input data; generate a content embedding based on the input data;

extract second prosody data from target speech; generate a speaker embedding from the target speech; generate a prosody embedding from the second prosody data; and generate, based on the first prosody data and the prosody embedding, converted prosody data.

Aspect 2. The apparatus of Aspect 1, wherein the input data comprises one or more of speech data or text data.

Aspect 3. The apparatus of Aspect 2, wherein the input data comprises one of speech data and text data.

Aspect 4. The apparatus of any one of Aspects 1 to 3, wherein the first prosody data comprises one or more of a fundamental frequency, an energy value and a speed value.

Aspect 5. The apparatus of any one of Aspects 1 to 4, wherein the second prosody data comprises one or more of a fundamental frequency, an energy value and a speed value.

Aspect 6. The apparatus of any one of Aspects 1 to 5, wherein the one or more processors are configured to: generate a converted spectrogram based on the converted prosody data, the speaker embedding and the content embedding; and generate the converted spectrogram based on the converted prosody data, the speaker embedding and the content embedding via a decoder comprising a diffusion decoder or a non-diffusion decoder.

Aspect 7. The apparatus of Aspect 6, wherein the one or more processors are configured to: generate, based on the converted prosody data, a predicted global speaking rate and via a rate control engine, a speaking rate for the converted spectrogram; and generating, via a vocoder, converted speech based on the input data.

Aspect 8. The apparatus of Aspect 7, wherein the vocoder comprises a neural vocoder.

Aspect 9. The apparatus of any one of Aspects 6 to 8, wherein the one or more processors are configured to: extract the first prosody data from the input data via a first prosody extractor engine; generate the content embedding based on the input data via a content encoder; extract the second prosody data from target speech via a second prosody extractor engine; generate the speaker embedding from the target speech via a speaker encoder; generate the prosody embedding from the second prosody data via a prosody encoder; generate, based on the first prosody data and the prosody embedding, converted prosody data via a prosody conversion engine; and generate the converted spectrogram based on the converted prosody data, the speaker embedding and the content embedding via a decoder.

Aspect 10. The apparatus of Aspect 9, wherein the apparatus comprises the decoder, and wherein the decoder is configured to synthesize a speech spectrum conditioned on the content embedding, the speaker embedding, and the converted prosody data.

Aspect 11. The apparatus of any one of Aspects 7 to 10, wherein the rate control engine is configured to manipulate a speaking rate depending upon a predicted speed.

Aspect 12. The apparatus of any one of Aspects 9 to 11, wherein the prosody encoder is configured to generate the prosody embedding at one or more of a frame-level or a sentence-level.

Aspect 13. The apparatus of Aspect 12, wherein the apparatus comprises the prosody encoder, and wherein the prosody encoder is configured to generate the prosody embedding at the frame-level to enable frame-level intonation control.

Aspect 14. The apparatus of any one of Aspects 7 to 13, wherein the one or more processors are configured to: generate, based on the converted prosody data via the rate control engine, the speaking rate for the converted spectrogram independent of an automatic speech recognition model.

Aspect 15. A method of generating output speech from input data, the method comprising: extracting first prosody data from the input data; generating a content embedding based on the input data; extracting second prosody data from target speech; generating a speaker embedding from the target speech; generating a prosody embedding from the second prosody data; and generating, based on the first prosody data and the prosody embedding, converted prosody data.

Aspect 16. The method of Aspect 15, wherein the input data comprises one or more of speech data or text data.

Aspect 17. The method of Aspect 16, wherein the input data comprises one of speech data and text data.

Aspect 18. The method of any one of Aspects 15 to 17, wherein the first prosody data comprises one or more of a fundamental frequency, an energy value and a speed value.

Aspect 19. The method of any one of Aspects 15 to 18, wherein the second prosody data comprises one or more of a fundamental frequency, an energy value and a speed value.

Aspect 20. The method of any one of Aspects 15 to 19, further comprising: generating a converted spectrogram based on the converted prosody data, the speaker embedding and the content embedding; and generating the converted spectrogram based on the converted prosody data, the speaker embedding and the content embedding via a decoder comprising a diffusion decoder or a non-diffusion decoder.

Aspect 21. The method of Aspect 20, further comprising: generating, based on the converted prosody data, a predicted global speaking rate and via a rate control engine, a speaking rate for the converted spectrogram; and generating, via a vocoder, converted speech based on the input data.

Aspect 22. The method of Aspect 21, wherein the vocoder comprises a neural vocoder.

Aspect 23. The method of any one of Aspects 20 to 22, further comprising: extracting the first prosody data from the input data via a first prosody extractor engine; generating the content embedding based on the input data via a content encoder; extracting the second prosody data from target speech via a second prosody extractor engine; generating the speaker embedding from the target speech via a speaker encoder; generating the prosody embedding from the second prosody data via a prosody encoder; generating, based on the first prosody data and the prosody embedding, converted prosody data via a prosody conversion engine; and generating the converted spectrogram based on the converted prosody data, the speaker embedding and the content embedding via a decoder.

Aspect 24. The method of Aspect 23, wherein the method is performed by a decoder, and wherein the decoder is configured to synthesize a speech spectrum conditioned on the content embedding, the speaker embedding, and the converted prosody data.

Aspect 25. The method of any one of Aspects 21 to 24, wherein the rate control engine is configured to manipulate a speaking rate depending upon a predicted speed.

Aspect 26. The method of any one of Aspects 23 to 25, the prosody encoder is configured to generate the prosody embedding at one or more of a frame-level or a sentence-level.

Aspect 27. The method of Aspect 26, wherein the method is performed by a prosody encoder, and wherein the prosody encoder is configured to generate the prosody embedding at the frame-level to enable frame-level intonation control.

Aspect 28. The method of any one of Aspects 21 to 27, further comprising: generating, based on the converted prosody data via the rate control engine, the speaking rate for the converted spectrogram independent of an automatic speech recognition model.

Aspect 29. A non-transitory computer-readable medium having stored thereon instructions which, when executed by one or more processors, cause the one or more processors to be configured to: extract first prosody data from input data; generate a content embedding based on the input data; extract second prosody data from target speech; generate a speaker embedding from the target speech; generate a prosody embedding from the second prosody data; and generate, based on the first prosody data and the prosody embedding, converted prosody data.

Aspect 30. An apparatus comprising: means for extracting first prosody data from input data; means for generating a content embedding based on the input data; means for extracting second prosody data from target speech; means for generating a speaker embedding from the target speech; means for generating a prosody embedding from the second prosody data; and means for generating, based on the first prosody data and the prosody embedding, converted prosody data.

Aspect 31. A non-transitory computer-readable medium having stored thereon instructions which, when executed by one or more processors, cause the one or more processors to be configured to perform operations according to any of Aspects 15 to 28.

Aspect 32. A non-transitory computer-readable medium having stored thereon instructions which, when executed by one or more processors, cause the one or more processors to be configured to perform operations according to any of Aspects 15 to 28.

What is claimed is:

1. An apparatus to generate output speech from input data, comprising:

one or more memories configured to store the input data; and one or more processors coupled to the one or more memories and configured to:

extract first prosody data from the input data;

generate a content embedding based on the input data;

extract second prosody data from target speech;

generate a speaker embedding from the target speech;

generate a prosody embedding from the second prosody data;

generate, based on the first prosody data and the prosody embedding, converted prosody data;

generate a converted spectrogram based on the converted prosody data, the speaker embedding, and the content embedding; and generate converted speech based on converted spectrogram.

2. The apparatus of claim 1, wherein the input data comprises one or more of speech data or text data.

3. The apparatus of claim 2, wherein the input data comprises one of speech data and text data.

4. The apparatus of claim 1, wherein the first prosody data comprises one or more of a fundamental frequency, an energy value and a speed value.

5. The apparatus of claim 1, wherein the second prosody data comprises one or more of a fundamental frequency, an energy value and a speed value.

6. The apparatus of claim 1, wherein the one or more processors are configured to:

generate the converted spectrogram based on the converted prosody data, the speaker embedding, and the content embedding via a decoder comprising a diffusion decoder or a non-diffusion decoder.

7. The apparatus of claim 1, wherein the one or more processors are configured to:

generate, based on the converted prosody data, a predicted global speaking rate and via a rate control engine, a speaking rate for the converted spectrogram; and generating, via a vocoder, the converted speech based on the input data.

8. The apparatus of claim 7, wherein the vocoder comprises a neural vocoder.

9. The apparatus of claim 7, wherein the rate control engine is configured to manipulate a speaking rate depending upon a predicted speed.

10. The apparatus of claim 7, wherein the one or more processors are configured to:

generate, based on the converted prosody data via the rate control engine, the speaking rate for the converted spectrogram independent of an automatic speech recognition model.

11. The apparatus of claim 1, wherein the one or more processors are configured to:

extract the first prosody data from the input data via a first prosody extractor engine;

generate the content embedding based on the input data via a content encoder;

extract the second prosody data from target speech via a second prosody extractor engine;

generate the speaker embedding from the target speech via a speaker encoder;

generate the prosody embedding from the second prosody data via a prosody encoder;

generate, based on the first prosody data and the prosody embedding, converted prosody data via a prosody conversion engine; and generate the converted spectrogram based on the converted prosody data, the speaker embedding and the content embedding via a decoder.

12. The apparatus of claim 11, wherein the apparatus comprises the decoder, and wherein the decoder is configured to synthesize a speech spectrum conditioned on the content embedding, the speaker embedding, and the converted prosody data.

13. The apparatus of claim 11, the prosody encoder is configured to generate the prosody embedding at one or more of a frame-level or a sentence-level.

14. The apparatus of claim 13, wherein the apparatus comprises the prosody encoder, and wherein the prosody encoder is configured to generate the prosody embedding at the frame-level to enable frame-level intonation control.

15. The apparatus of claim 1, wherein the input data comprises speech data, the apparatus further comprising one or more microphones configured to capture the speech data.

16. The apparatus of claim 1, further comprising one or more speakers configured to output speech data comprising the converted prosody data.

17. A method of generating output speech from input, the method comprising:
extracting first prosody data from input data;
generating a content embedding based on the input data;
extracting second prosody data from target speech;
generating a speaker embedding from the target speech;
generating a prosody embedding from the second prosody data;
generating, based on the first prosody data and the prosody embedding, converted prosody data;
generating a converted spectrogram based on the converted prosody data, the speaker embedding, and the content embedding; and
generating converted speech based on converted spectrogram.

18. The method of claim 17, wherein the input data comprises one or more of speech data or text data.

19. The method of claim 18, wherein the input data comprises one of speech data and text data.

20. The method of claim 17, wherein the first prosody data comprises one or more of a fundamental frequency, an energy value and a speed value.

21. The method of claim 17, wherein the second prosody data comprises one or more of a fundamental frequency, an energy value and a speed value.

22. The method of claim 17, further comprising:
generating the converted spectrogram based on the converted prosody data, the speaker embedding, and the content embedding via a decoder comprising a diffusion decoder or a non-diffusion decoder.

23. The method of claim 17, further comprising:
generating, based on the converted prosody data, a predicted global speaking rate and via a rate control engine, a speaking rate for the converted spectrogram; and
generating, via a vocoder, the converted speech based on the input data.

24. The method of claim 23, wherein the vocoder comprises a neural vocoder.

25. The method of claim 23, further comprising manipulating, using the rate control engine, a speaking rate depending upon a predicted speed.

26. The method of claim 23, further comprising:
generating, based on the converted prosody data via the rate control engine, the speaking rate for the converted spectrogram independent of an automatic speech recognition model.

27. The method of claim 17, further comprising:
extracting the first prosody data from the input data via a first prosody extractor engine;
generating the content embedding based on the input data via a content encoder;
extracting the second prosody data from target speech via a second prosody extractor engine;
generating the speaker embedding from the target speech via a speaker encoder;
generating the prosody embedding from the second prosody data via a prosody encoder;
generating, based on the first prosody data and the prosody embedding, converted prosody data via a prosody conversion engine; and
generating the converted spectrogram based on the converted prosody data, the speaker embedding and the content embedding via a decoder.

28. The method of claim 27, further comprising synthesizing, using a decoder, a speech spectrum conditioned on the content embedding, the speaker embedding, and the converted prosody data.

29. The method of claim 27, further comprising generating, using the prosody encoder, the prosody embedding at one or more of a frame-level or a sentence-level.

30. The method of claim 29, further comprising generating, using a prosody encoder, the prosody embedding at the frame-level to enable frame-level intonation control.

* * * * *